US009599299B2

(12) United States Patent
Hoang

(10) Patent No.: US 9,599,299 B2
(45) Date of Patent: Mar. 21, 2017

(54) SUN, RAIN AND WIND POWERED LIGHT

(71) Applicant: Kieu Hoang, Agoura Hills, CA (US)

(72) Inventor: Kieu Hoang, Agoura Hills, CA (US)

(*) Notice: Subject to any disclaimer, the term of this patent is extended or adjusted under 35 U.S.C. 154(b) by 26 days.

(21) Appl. No.: 13/918,328

(22) Filed: Jun. 14, 2013

(65) Prior Publication Data

US 2014/0153226 A1 Jun. 5, 2014

Related U.S. Application Data

(60) Provisional application No. 61/659,636, filed on Jun. 14, 2012.

(51) Int. Cl.

| F21L 4/00 | (2006.01) |
|---|---|
| F21L 13/00 | (2006.01) |
| F21S 9/03 | (2006.01) |
| F03D 9/00 | (2016.01) |
| F21S 8/08 | (2006.01) |
| F21S 9/02 | (2006.01) |
| F21S 8/04 | (2006.01) |
| F21S 9/04 | (2006.01) |
| H02S 40/38 | (2014.01) |
| H02S 10/10 | (2014.01) |
| F21W 131/103 | (2006.01) |

(52) U.S. Cl.
CPC .............. *F21S 9/035* (2013.01); *F03D 9/00* (2013.01); *F21S 8/04* (2013.01); *F21S 8/085* (2013.01); *F21S 9/026* (2013.01); *F21S 9/028* (2013.01); *F21S 9/03* (2013.01); *F21S 9/043* (2013.01); *F21S 9/046* (2013.01); *H02S 10/10* (2014.12); *H02S 40/38* (2014.12); *F05B 2220/708* (2013.01); *F05B 2240/911* (2013.01); *F21W 2131/103* (2013.01); *Y02E 10/728* (2013.01)

(58) Field of Classification Search
CPC . F03D 1/00; F03D 9/007; F03D 9/008; F05B 2220/708; F05B 2240/911; F21S 8/085; F21S 9/026; F21S 9/028; F21S 9/03; F21S 9/035; F21S 9/037; F21S 9/043; F21S 9/046; F21S 8/04; F21W 2131/103; Y02E 10/728; H02S 40/38; H02S 10/10
USPC .................................................. 362/183
See application file for complete search history.

(56) References Cited

U.S. PATENT DOCUMENTS

| 4,200,904 | A | * | 4/1980 | Doan | 362/183 |
|---|---|---|---|---|---|
| 6,097,104 | A | * | 8/2000 | Russell | 290/54 |
| 6,559,552 | B1 | * | 5/2003 | Ha | 290/54 |
| 7,321,173 | B2 | * | 1/2008 | Mann | 290/55 |
| 2009/0237918 | A1 | * | 9/2009 | Yang | 362/183 |
| 2009/0268441 | A1 | * | 10/2009 | Chen | 362/192 |
| 2009/0273922 | A1 | * | 11/2009 | Ho et al. | 362/183 |

(Continued)

*Primary Examiner* — Jong-Suk (James) Lee
*Assistant Examiner* — Erin Kryukova
(74) *Attorney, Agent, or Firm* — Merek, Blackmon & Voorhees, LLC

(57) ABSTRACT

An outdoor light unit has plural self-contained mechanisms for producing electricity for powering the light unit, the light unit including a support, an electrical lamp, photovoltaic material at its top, an electrical generator, and water impingement blades and wind turbine blades to turn the generator to power the lamp. A rainwater collector collects rainwater running off of the photovoltaic material and directs it onto the water impingement blades. The generator and the rainwater collector are mounted to pivot with respect to the support, and fins cause the wind turbine blades to face into the wind.

11 Claims, 2 Drawing Sheets

(56) References Cited

U.S. PATENT DOCUMENTS

| | | | |
|---|---|---|---|
| 2010/0090605 A1* | 4/2010 | Nevins | 315/159 |
| 2010/0154786 A1* | 6/2010 | Li | A45B 23/00 |
| | | | 126/624 |
| 2010/0183443 A1* | 7/2010 | Thorne | 416/146 R |
| 2010/0220467 A1* | 9/2010 | Daidone et al. | 362/183 |
| 2011/0006540 A1* | 1/2011 | Ignatiev et al. | 290/55 |
| 2011/0204644 A1* | 8/2011 | Perregrini | 290/53 |
| 2011/0260464 A1* | 10/2011 | Sanvik | 290/55 |
| 2014/0036521 A1* | 2/2014 | Elliott | 362/459 |

\* cited by examiner

SUN, RAIN AND WIND POWERED LIGHT

CROSS-REFERENCE TO RELATED APPLICATION

The present application claims the benefit under 35 USC 119(e) of the priority of U.S. provisional patent application 61/659,636 filed on Jun. 14, 2012 by the present inventors, which is hereby incorporated by reference in its entirety.

BACKGROUND OF THE INVENTION

The present invention relates to a self-generating outdoor light and, more particularly, to a self-generating outdoor light unit that includes plural self-contained mechanisms for producing electricity for powering the light.

SUMMARY OF THE INVENTION

The sun, rain and wind powered light unit according to the present invention includes a lamp mounted on the top of a support, wherein a stationary top portion of the unit in a pyramid, or generally conical-type shape, is defined by a form of photovoltaic material angled toward the direction of the sun in order to convert UV rays into a form of electrical current that is stored in an accumulator type battery, which can be located in the support, in order to power the lamp at night or at other times when required. The light unit according to the present invention also includes an arrangement for generating electrical current from rain and/or wind. If there is rain or wind at night, the arrangement generates electrical current that powers the lamp and at the same time stores electrical energy in an accumulator type battery until the battery is fully charged. If there is rain or wind during the day, the arrangement generates electrical current and stores it in the accumulator type battery until the battery is fully charged. In one embodiment of the present invention, there is an accumulator type battery, or a set of accumulator type batteries, provided for connection to each source of power—sun, wind and rain. In such an embodiment, it is contemplated that the battery, or batteries, connected to the photovoltaic material will be used to power the lamp, unless or until the power from that battery or batteries runs out.

A rain catcher mounted on the support under the bottom of the perimeter of the pyramid, or generally conical, shaped photovoltaic material collects rainwater flowing from the surface of the photovoltaic material, and an outlet of the rain catcher funnels and directs the collected rainwater at water impingement blades connected to the shaft of a generator, so that the flow of the rainwater passing through the outlet of the rain catcher turns the blades in order to generate electricity for direct use by the lamp or for storage in the accumulator type battery. The faces of the water impingement blades can be parallel to the axis of the generator shaft, and the outlet of the rain catcher is vertically aligned with the blades on one side of the shaft rather than being vertically aligned with the shaft itself.

Smaller, wind turbine blades, which are connected to the generator shaft, are turned by the wind to rotate the shaft. Both the water impingement blades and the wind turbine blades are rigidly connected to the same shaft. Tail fins connected to the generator cause the generator to pivot around the vertical axis of the support so that the axis of rotation of the wind turbine blades is aligned with the direction of the wind. The rain catcher is mounted to pivot with the generator, so that the outlet of the rain catcher remains in vertical alignment with the water turbine blades on one side of the generator shaft when the generator pivots around the vertical axis of the support. The photovoltaic material is electrically connected to an electrical controller that is directly connected to the accumulator type battery associated with the photovoltaic material. The generator is connected to a separate electrical component that is also connected to the accumulator type battery. The photovoltaic material and the generator send electrical current to the accumulator type battery for storage, so that the battery can provide the energy to power the lamp during the night. The generator also sends electrical current directly to the lamp to power the lamp during the night.

DETAILED DESCRIPTION OF THE PREFERRED EMBODIMENTS

Figure 1:
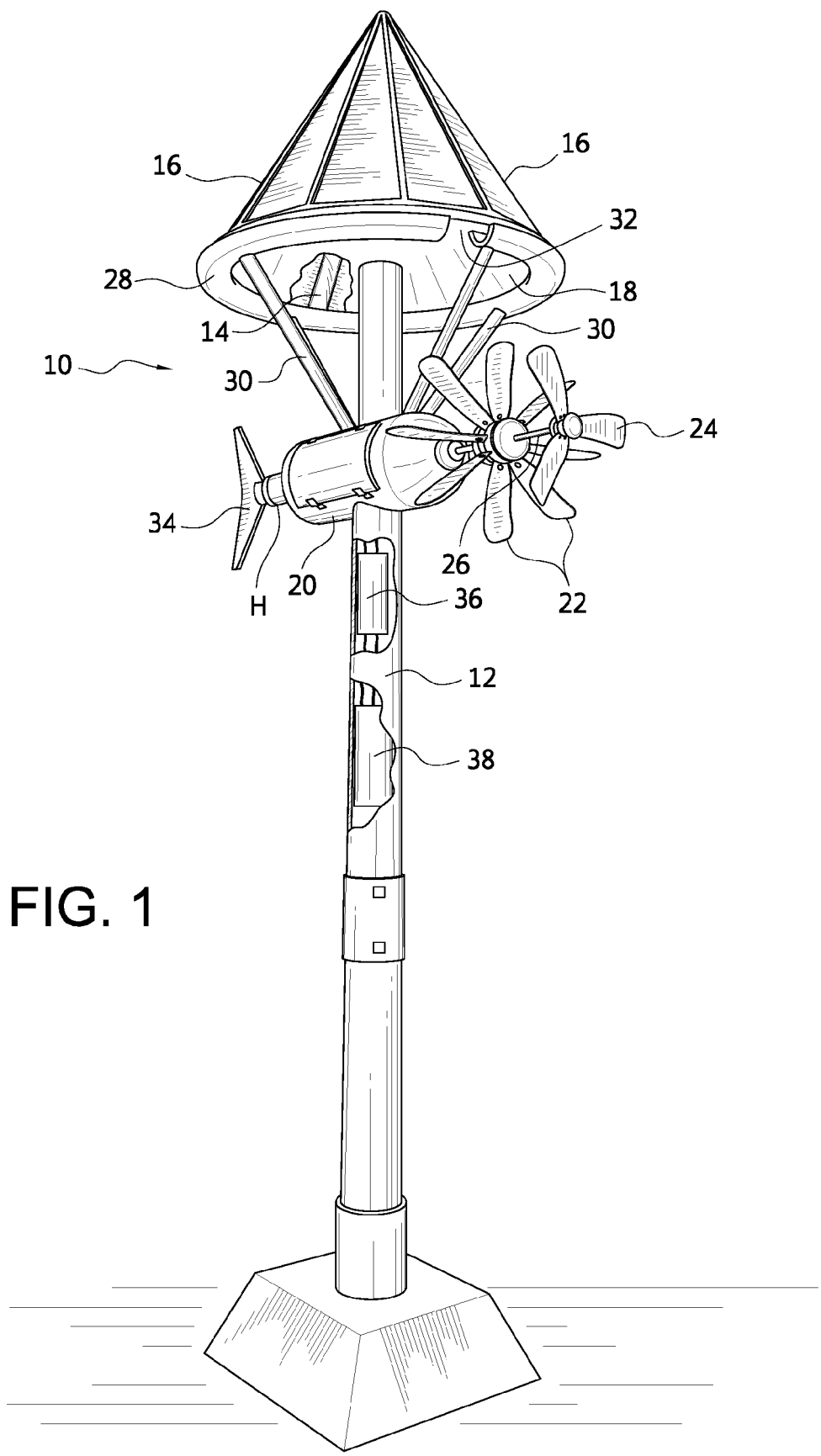
FIG. 1 is a perspective view from the front and left side of a light unit according to the present invention.
Figure 2:
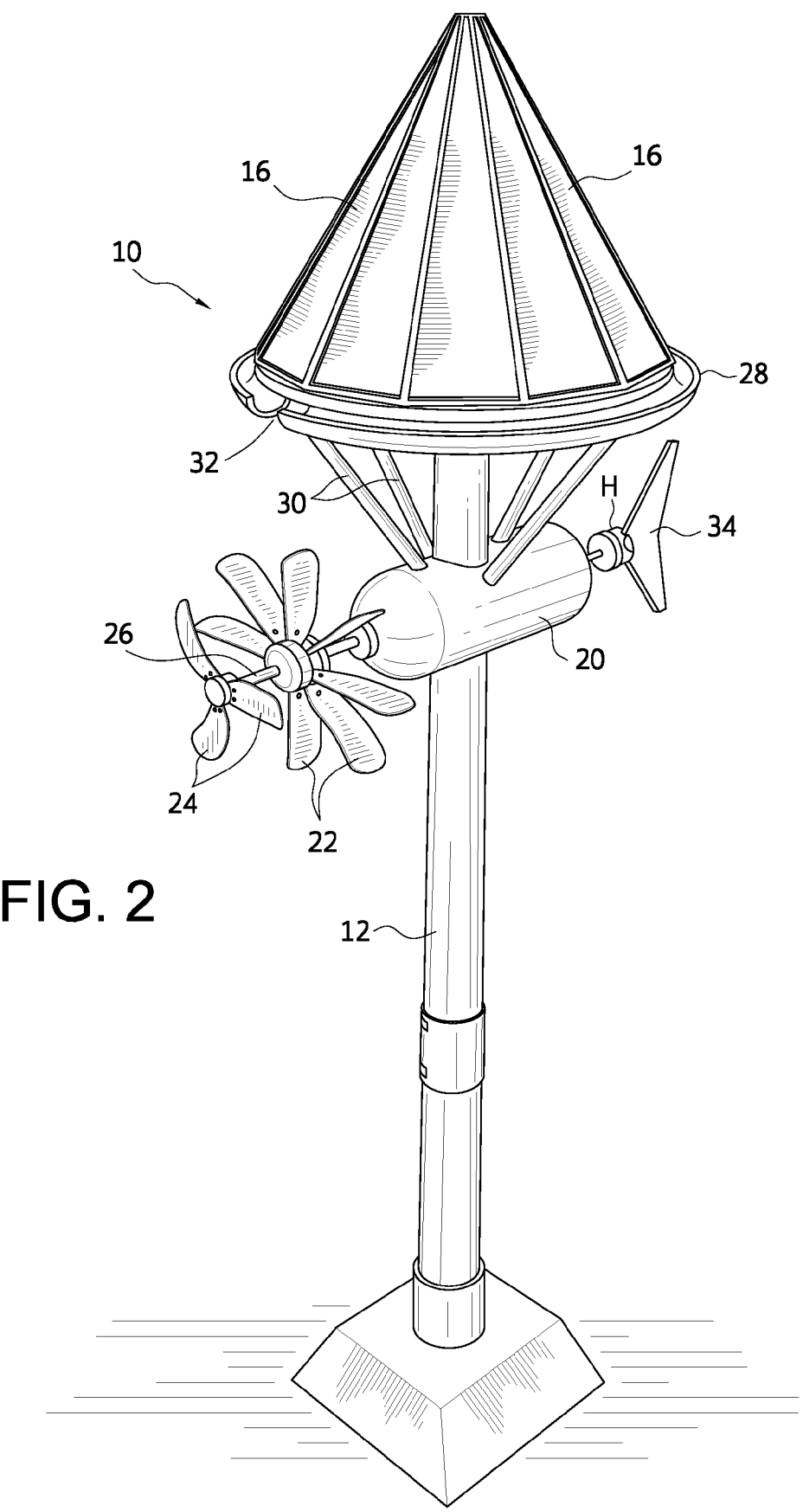
FIG. 2 is a perspective view from the front, top and right side of the light unit of FIG. 1.

As can be seen from FIGS. 1 and 2, an outdoor light unit according to the present invention, which is designated generally by the reference numeral 10, is shown extending vertically upward from a horizontal surface. The outdoor light unit 10 is to be anchored in a conventional manner.

The outdoor light unit 10 includes an elongate, generally vertical support 12, for example, a post, for supporting the unit, and an electrical lamp 14 mounted on the support 12, near the top of the support. Photovoltaic material in the form of a plurality of triangular photovoltaic panels 16 define the top portion of the outdoor light unit 10, the photovoltaic panels forming a pyramid, a generally conical shape at, wherein each panel lies at an acute angle with respect to the vertical axis of the plurality of panels in order to face the sun. The photovoltaic panels 16 transform light into electricity to power the electrical lamp 14. The electrical lamp 14 is protected from the weather by the photovoltaic panels 16 and/or by a structure (not shown) lying between the electrical lamp and the photovoltaic panels. The electrical lamp 14 is also protected from the weather by a transparent or translucent panel 18 that extends across the base of the pyramid of photovoltaic panels 16 and below the electrical lamp 14. A portion of the panel 18 is broken away in FIG. 1 to show the electrical lamp 14, which can be, for example, one or more fluorescent tubes.

The lamp 14 can be turned on by the current being produced by the photovoltaic panels 16 falling below a predetermined threshold. As an alternative, a conventional light-sensitive switch for turning on streetlights can be used to turn on the lap 14 at dusk, or any other times when the natural light is reduced to the level of the natural light at dusk. As another alternative, the lamp 14 can be turned on by the owner of the lamp, whether the owner is an individual, a company or governmental agency.

The outdoor light unit 10 also includes an electrical generator 20, or dynamo, and a plurality of blades 22 and 24 mounted on a shaft 26 of the generator 20 to turn the generator shaft to produce electricity to power the electrical lamp 14. The blades 22 are water impingement blades that are configured to be moved in rotation around the axis of the generator shaft 26 by a stream of rainwater that flows tangentially with respect to a circle defined by the water impingement blades on the generator shaft 26. The configuration of the water impingement blades 22 includes surfaces that are preferably parallel to the axis of the generator shaft 26, so that the surfaces are perpendicular to the stream of rainwater. Each water impingement blade 22 can be, for example, about 0.5 meters in length.

The outdoor light unit 10 further includes an arrangement for directing a stream of rainwater onto the water impingement blades 22. The arrangement includes a rainwater collector 28 defined by an annular trough having the outdoor light unit support 12 at its center. The entire open top of the annular trough is in vertical alignment with the bottom ends of the pyramid of photovoltaic panels 16 in order to receive rainwater running off of the panels. The rainwater collector 28 is supported by a plurality of struts 30 extending from the rainwater collector to the generator 20. The annular trough of the rainwater collector 28 is not quite a complete annulus. Instead, a small section of the annulus is omitted such that the rainwater collector 28 defines an outlet 32 between the ends of the annulus, the collected rainwater flowing downward from the outlet. The ends of the annular trough at the outlet 32 are open, so that the rainwater collected in the trough can flow out the ends and down. The outlet 32 is in vertical alignment with the water impingement blades 22 on one side of the generator shaft 26, so that water flowing from the outlet 32 of the rainwater collector 28 flows in a path spaced radially inward toward the generator shaft 26 from a circle defined by the water impingement blades 22 as they rotate around the generator shaft 26. The surface of each water impingement blade 22 that is impinged upon by the rainwater falling from the outlet 32 is preferably perpendicular to the flow of the rainwater.

The wind turbine blades 24 are configured to be turned by wind, especially by wind blowing axially with respect to the generator shaft 26. The electrical generator 20 and the wind turbine blades 24 are pivotally mounted with respect to the support 12, and the outdoor light unit 10 includes an arrangement to pivot the electrical generator 20 and the wind turbine blades 24 such that the blades 24 face the wind. The arrangement to pivot the electrical generator 20 and the wind turbine blades 24 can include one or more fins 34, which can be connected to the electrical generator 20 such that the fins are fixed relative to the electrical generator. Additional fins can be attached to the hub H, next to the fins 34, if additional fins are desired. The generator 20 and the rainwater collector 28 are mounted for rotation with respect to the support 12 by any conventional mounting arrangement for that purpose.

The photovoltaic panels 16 are electrically connected to an electrical controller 36 that is directly connected to an accumulator type battery 38 associated with the photovoltaic panels. The generator 20 is connected to a separate electrical component (not shown) that is also connected to the accumulator type battery 38. The photovoltaic panels 16 and the generator 20 send electrical current to the accumulator type battery 38 for storage, so that the battery can provide the energy to power the lamp 14 during the night. The generator 20 also sends electrical current directly to the lamp 14 to power the lamp during the night. The generator 20 is electrically connected to the controller 36 by, for example, a rotating electrical connector, which is well known.

At night, if there is wind and/or rain, the wind turbine blades 24 and the water impingement blades 22 generate electricity that is sent directly to the lamp 14, while excess electricity is sent through a conventional inverter (not shown) and stored in the battery 38. The lamp 14 draws power from the generator 20 at night, if there is any wind or rain and, at the same time, draws power from the battery 38, if not enough electricity is being generated by the generator. Once the battery is fully charged, additional electrical power generated by the outdoor light unit 10 can be sent externally to a nearby charging panel connected to a local grid, from which it can be sold back to an electrical energy provider in return for monetary or energy credits.

It will be apparent to those skilled in the art and it is contemplated that variations and/or changes in the embodiments illustrated and described herein may be made without departure from the present invention. Accordingly, it is intended that the foregoing description is illustrative only, not limiting, and that the true spirit and scope of the present invention will be determined by the appended claims.

The invention claimed is:

1. An outdoor light unit comprising:
   a stationary structural support for supporting the light unit;
   an electrical lamp mounted on the support;
   photovoltaic panels for generating electricity from a UV rays source to power the lamp;
   a rotary electrical generator pivotably mounted to said support for generating electricity from a wind source and from a rain source to power the lamp;
   a shaft on said rotary electrical generator for generating electrically when said shaft is rotated;
   wherein the rotary electrical generator is connected by said shaft to a first set of wind turbine blades for rotating the shaft of the rotary electrical generator under the influence of the wind source and said shaft is also connected to a set of rainwater impingement blades for rotating the shaft of the rotary electrical generator under the influence of the rain source, and wherein said first set of wind blades and said set of rainwater impingement blades are axially separated along said shaft of said rotary electrical generator; and
   a rainwater collector for collecting rainwater from an exterior of said electrical lamp and directing the collected rainwater from the rainwater collector onto said set of rainwater impingement blades, wherein the rainwater collector has an open top having an annular shape and wherein the entire open top is in vertical alignment with bottom ends of the photovoltaic panels to receive rainwater running off the panels and the rainwater collector directing the rainwater onto the set of rainwater impingement blades.

2. The outdoor light unit according to claim 1, wherein the support is elongate and extends from a base to said electrical lamp with said rotary electrical generator mounted to said support intermediate said electrical lamp and said base.

3. The outdoor light unit according to claim 2, wherein a length of the support extends generally vertically.

4. The outdoor light unit according to claim 2, wherein the support is a pole.

5. The outdoor light unit according to claim 1, further comprising a battery mounted on the support, wherein the battery is for use in collecting excess generated electrical energy to be stored and which is used during times at which there is no source of energy being generated.

6. The outdoor light unit according to claim 1, wherein the photovoltaic panels comprises a plurality of photovoltaic materials defining a top portion of the outdoor light unit wherein each photovoltaic panel lies at a predetermined angle with respect to the vertical.

7. The outdoor light unit according to claim 1, wherein the rainwater collector includes a gutter having a collected rainwater outlet above and in vertical alignment with the set of rainwater impingement blades.

8. The outdoor light unit according to claim 1, wherein the wind turbine blades are configured to be automatically rotated around the shaft of the rotary electrical generator by wind.

9. The outdoor light unit according to claim 8, wherein the rotary electrical generator and the wind turbine blades are pivotally mounted with respect to the support, and the outdoor light unit further comprises an arrangement to pivot the rotary electrical generator such that the axis of rotation of the wind turbine blades is aligned with the direction of the wind.

10. The outdoor light unit according to claim 1, wherein the rotary electrical generator and the wind turbine blades are pivotally mounted with respect to the support, and the outdoor light unit further comprises a plurality of tail fins to pivot the rotary electrical generator and the wind turbine blades to position the wind turbine blades to rotate about an axis in the direction of the wind.

11. An outdoor light unit comprising:
- an elongated structural support pole for supporting the light unit;
- an electrical lamp mounted on the support pole having a housing structure surrounding at least a portion of the electrical lamp;
- a plurality of photovoltaic panels arranged about the electrical lamp housing structure;
- a rotary electrical generator pivotably mounted to said support and having a rotary shaft for generating electricity from a wind source and from a rain source to power the lamp;
- the rotary electrical generator shaft having a first set of wind turbine blades mounted along the rotary electrical generator shaft for rotating the rotary electrical generator shaft under the influence of a wind source;
- the rotary electrical generator shaft having a set of rainwater impingement blades mounted along the rotary electrical generator shaft for rotating the rotary electrical generator shaft under the influence of a rain source, wherein said first set of wind turbine blades and said set of rainwater impingement blades are axially separated along said rotary electrical generator shaft;
- a rainwater collector for collecting rainwater from the exterior of said electrical lamp and directing the collected rainwater from the rainwater collector onto said set of rainwater impingement blades for rotating the rotary electrical generator shaft; and
- a battery for receiving electricity generated by the rotary electrical generator and for powering the electrical lamp when the rotary electrical generator is producing insufficient electrical energy to power the electrical lamp.

* * * * *